Dec. 7, 1937.   K. E. PORTER   2,101,281
DINNER PAIL
Filed Sept. 24, 1936

Inventor
Kirk E. Porter
By *Frease and Bishop*
Attorneys

Patented Dec. 7, 1937

2,101,281

UNITED STATES PATENT OFFICE 2,101,281

DINNER PAIL

Kirk E. Porter, Wooster, Ohio, assignor to The Buckeye Aluminum Company, Wooster, Ohio, a corporation of Ohio Application September 24, 1936, Serial No. 102,339

4 Claims. (Cl. 220—23)

The invention relates to dinner pails and more particularly to a pail of this type especially constructed for use by miners and the like and so constructed that it comprises separate compartments for liquid and food with a separate tray for pie or the like and a lid arranged to be locked thereon so as to prevent spilling of the contents in the event the pail is dropped or upset.

The object of the improvement is to provide a dinner pail of this character including a pail adapted to contain liquid, a food container adapted to frictionally fit within the upper open end of the pail forming a liquid-tight closure therefor, a tray for pie or the like adapted to fit within the upper open end of the food container and a hood cover adapted to be locked upon the food container and having a depending flange provided with a rim bead adapted to fit tightly over the rim bead of the pail forming a liquid-tight joint.

A further object is to provide such a pail in which the food container and locked hood cover may be removed as a unit retaining and securely holding the entire food section with the food enclosed and protected therein, permitting the miner to drink from the liquid contents of the pail without disturbing or soiling the food.

Another object of the improvement is to provide inwardly disposed locking lugs upon the hood cover adapted to engage beneath the rim bead of the food container to lock the cover thereon, said rim bead of the food container having oppositely disposed flattened portions to receive said locking lugs when the cover is placed upon or removed from the food container.

Figure 2:
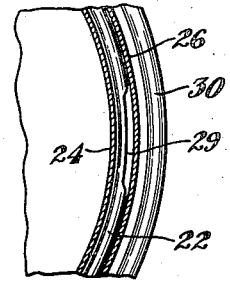
Figure 1:
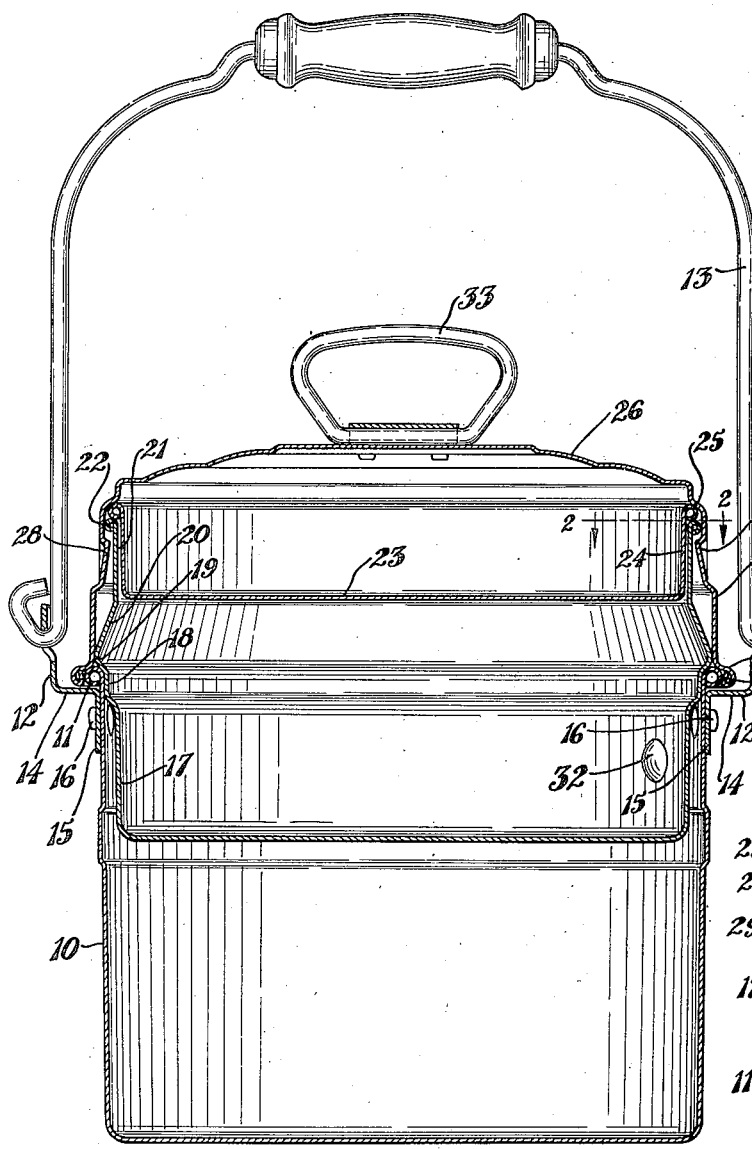
Figure 3:
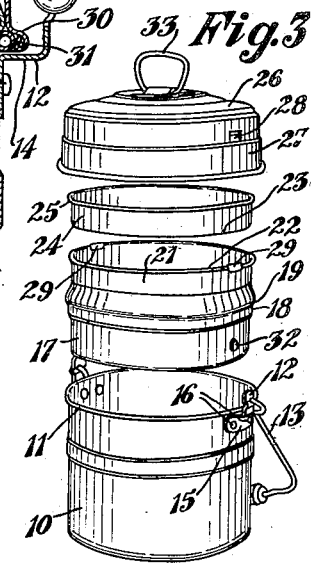

The above objects together with others which will be apparent from the drawing and following description, or which may be hereinafter referred to, may be attained by constructing the improved dinner pail in the manner illustrated in the accompanying drawing, in which Figure 1 is a vertical sectional view through a dinner pail constructed in accordance with the invention, showing the same in assembled condition with the cover in locked position;

Fig. 2, a section taken as on the line 2—2, Fig. 1 with the cover in unlocked position; and Fig. 3, a perspective view of the several members of the improved dinner pail.

Similar numerals refer to similar parts throughout the drawing.

The improved dinner pail includes the liquid container or pail 10 which may be substantially cylindric in form and provided with the outturned rim bead 11 around its upper edge. The offset ears 12 may be attached to diametrically opposite sides of the pail 10 just below the bead 11 for supporting the bail 13 in usual and ordinary manner.

The angular offset portion 14 of each ear 12 is located intermediate the extremities of the ear and is of sufficient length to space the ear 12 a considerable distance away from the rim bead 11, as best shown in Fig. 1. The lower attaching portion 15 of each ear may be of greater width than the remaining portion of the ear so as to accommodate two rivets or the like, as indicated at 16, for securely fastening the ear to the side wall of the pail.

The food container or inset 17 is provided with the central annular enlargement 18 adapted to fit snugly within the upper open end of the pail and over the rim bead 11 thereof, as indicated at 19, being then preferably tapered inwardly and upwardly as at 20, terminating in the cylindric open upper end portion 21 which may be finished with a rim bead 22.

For the purpose of conveniently and safely carrying pie or the like, a tray 23 may be provided in the form of an inset to be received within the upper end of the food container 17, the peripheral flange 24 of said tray preferably terminating in the outturned rim bead 25 adapted to rest upon the rim bead 22 of the food container.

The hood cover indicated generally at 26 has the depending annular flange 27 provided on opposite sides with the inwardly pressed or stamped locking lugs 28 adapted to be received beneath the outturned rim bead 22 of the food container 17 to lock the hood cover upon the food container. In order to permit the hood cover to be placed upon and removed from the food container, this rim bead 22 of the food container is flattened upon opposite sides, as indicated at 29, so as to receive the locking lugs 28.

The lower end of the annular flange 27 of the hood cover may be outturned as at 30 to fit over the rim bead 11 of the pail and is provided with the internal annular bead 31 adapted to frictionally engage said rim bead 11 so as to provide a substantially liquid-tight joint between the pail and hood cover.

For the purpose of indicating to the user the position of the flattened portions 29 of the rim bead 22, when the hood cover is in place upon the food container, a marker of any suitable description such as the inwardly pressed depression or socket 32 may be formed in the side walls of the food container 17, directly beneath the flattened portions 29 of the rim bead thereof.

For convenience in placing the food container within the upper end of the pail, these markers 32 may be lined up with the bail ears 12 and since the handle 33 of the hood cover is in line with the locking lugs 28, the cover may be quickly and easily operated to unlock and remove the same by thus turning the handle 33 until it is in line with the ears 12. In this manner the positions of the cover locking lugs and recesses 29 are always known so that the food container and cover may be removed as a unit or the cover only removed from the assembly, depending upon whether access is desired to the liquid in the pail or the food in the container 17. It will be seen that by placing the cover in position upon the food container as above described and giving it a quarter turn, the cover is securely locked upon the food container.

I claim:

1. A dinner pail including a liquid pail having an outturned bead at its upper end, a food container adapted to fit within the upper open end of the pail and having an outturned rim bead with flattened portions, a hood cover for the food container having an outturned lower end provided with an inturned bead frictionally fitting the outturned bead on the liquid pail, and locking lugs in said cover adapted to pass the flattened portions of the bead, the cover being adapted to be turned upon the container to locate the lugs in locking position beneath the bead and a handle upon the cover whereby the food container and cover may be removed as a unit from the pail.

2. A dinner pail including a liquid pail having an outturned bead at its upper end, a food container adapted to fit within the upper open end of the pail and having an outturned rim bead with flattened portions, a hood cover for the food container having an outturned lower end provided with an inturned bead frictionally fitting the outturned bead on the liquid pail, locking lugs in said cover adapted to pass the flattened portions of the bead, the cover being adapted to be turned upon the container to locate the lugs in locking position beneath the bead, and a handle upon the cover in line with said locking lugs whereby the food container and cover may be removed as a unit from the pail.

3. A dinner pail including a liquid pail having an outturned bead at its upper end, a food container adapted to fit within the upper open end of the pail and having an outturned rim bead with flattened portions, a hood cover for the food container having an outturned lower end provided with an inturned bead frictionally fitting the outturned bead on the liquid pail, locking lugs in said cover adapted to pass the flattened portions of the bead, the cover being adapted to be turned upon the container to locate the lugs in locking position beneath the bead, and markers on said container below the cover and in vertical alinement with the flattened portions of the bead and a handle upon the cover in line with said locking lugs whereby the food container and cover may be removed as a unit from the pail.

4. A dinner pail including a substantially cylindric liquid pail having an outturned rim bead, a substantially cylindric food container having a central enlarged portion adapted to fit within the upper open end of the pail and to rest upon the rim bead thereof and having an outturned rim bead with flattened portions, a substantially cylindric hood cover for the food container having an outturned lower end provided with an inturned rim bead frictionally fitting the rim bead of the liquid pail, locking lugs in said cover adapted to pass the flattened portions of the bead, the cover being adapted to be turned upon the container to locate the lugs in locking position beneath the bead of the container and a handle upon the cover whereby the food container and cover may be removed as a unit from the pail.

KIRK E. PORTER.